United States Patent
Chae et al.

(10) Patent No.: US 11,638,276 B2
(45) Date of Patent: Apr. 25, 2023

(54) METHOD AND APPARATUS FOR V2X TERMINAL TRANSMITTING DATA IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 1171 days.

(21) Appl. No.: 16/065,547

(22) PCT Filed: Dec. 26, 2016

(86) PCT No.: PCT/KR2016/015281
§ 371 (c)(1),
(2) Date: Jun. 22, 2018

(87) PCT Pub. No.: WO2017/111565
PCT Pub. Date: Jun. 29, 2017

(65) Prior Publication Data
US 2020/0337067 A1 Oct. 22, 2020

Related U.S. Application Data

(60) Provisional application No. 62/339,937, filed on May 22, 2016, provisional application No. 62/335,061, filed on May 11, 2016, provisional application No. 62/387,477, filed on Dec. 24, 2015.

(51) Int. Cl.
*H04W 72/02* (2009.01)
*H04W 4/40* (2018.01)
*H04W 72/1263* (2023.01)
(Continued)

(52) U.S. Cl.
CPC ......... *H04W 72/1263* (2013.01); *H04W 4/40* (2018.02); *H04W 72/02* (2013.01);
(Continued)

(58) Field of Classification Search
CPC ... H04W 72/1263; H04W 4/40; H04W 72/02; H04W 72/1242; H04W 72/1247;
(Continued)

(56) References Cited

U.S. PATENT DOCUMENTS 10,743,336 B2 * 8/2020 Blasco Serrano .......................... H04W 72/1278
2015/0271840 A1 * 9/2015 Tavildar ................ H04L 1/0028
370/329

(Continued)

FOREIGN PATENT DOCUMENTS

WO 2015172395 A1 11/2015
WO WO-2017050154 A1 * 3/2017

OTHER PUBLICATIONS

Ericsson, "Discussion on V2X PC5 Scheduling, Resource Pools and Resource Patterns," 3GPP TSG RAN WG1 Meeting #83, Nov. 15-22, 2015, R1-157355.
(Continued)

*Primary Examiner* — Un C Cho
*Assistant Examiner* — Lalita W Pace
(74) *Attorney, Agent, or Firm* — Dentons US LLP

(57) ABSTRACT

One embodiment of the present invention relates to a method for a terminal transmitting control information and data in a wireless communication system, the method for transmitting the control information and the data comprising the steps of: transmitting a first piece of control information from a control information resource pool; and transmitting data through a resource indicated by the first piece of control information from a data resource pool, wherein the size of a transmission gap between the control information resource pool and the data resource pool is configured according to priority.

8 Claims, 13 Drawing Sheets

(51) Int. Cl.
*H04W 72/12* (2023.01)
*H04W 92/18* (2009.01)

(52) U.S. Cl.
CPC ... *H04W 72/1242* (2013.01); *H04W 72/1247* (2013.01); *H04W 72/1278* (2013.01); *H04W 92/18* (2013.01)

(58) Field of Classification Search
CPC ... H04W 72/1278; H04W 92/18; H04W 4/70; H04W 72/10; H04W 72/0406; H04L 5/0064; H04L 5/0053; H04L 5/0044
See application file for complete search history.

(56) References Cited

U.S. PATENT DOCUMENTS

| | | | |
|---|---|---|---|
| 2015/0326462 A1 | 11/2015 | Le et al. | |
| 2016/0197717 A1* | 7/2016 | Zhang | H04B 7/2656 370/337 |
| 2016/0295624 A1* | 10/2016 | Novlan | H04W 72/04 |
| 2016/0302215 A1* | 10/2016 | Sorrentino | H04W 76/14 |
| 2016/0353477 A1* | 12/2016 | Wang | H04W 74/085 |
| 2017/0024500 A1* | 1/2017 | Sebastian | G06F 30/20 |
| 2017/0092126 A1* | 3/2017 | Oshida | G08G 1/005 |
| 2017/0230939 A1* | 8/2017 | Rudolf | H04W 88/02 |
| 2018/0255563 A1* | 9/2018 | Chen | H04W 4/46 |
| 2018/0295628 A1* | 10/2018 | Lu | H04L 5/0058 |

OTHER PUBLICATIONS

Samsung, "Resource allocation and latency reduction enhancements for V2X," 3GPP TSG RAN WG1 Meeting #83, Nov. 15-22, 2015, R1-156811.

LG Electronics, "Discussion on resource pool structure and control signaling for PC5-based V2V," 3GPP TSG RAN WG1 Meeting #83, Nov. 15-22, 2015, R1-156892.

\* cited by examiner

FIG. 5
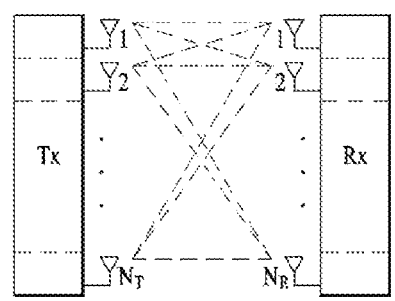
(a)
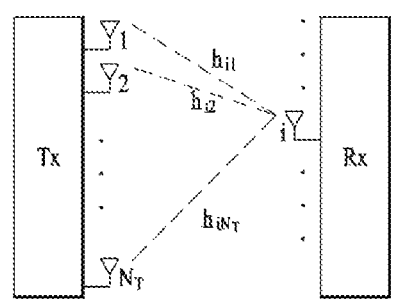
(b)

FIG. 8
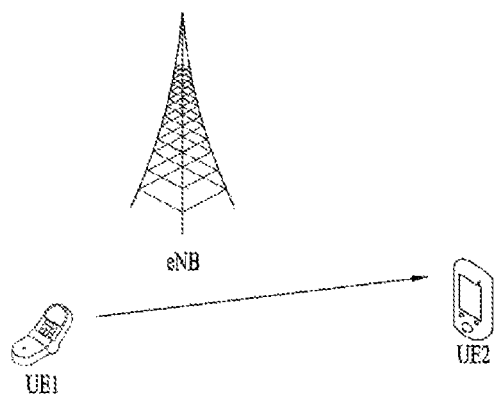
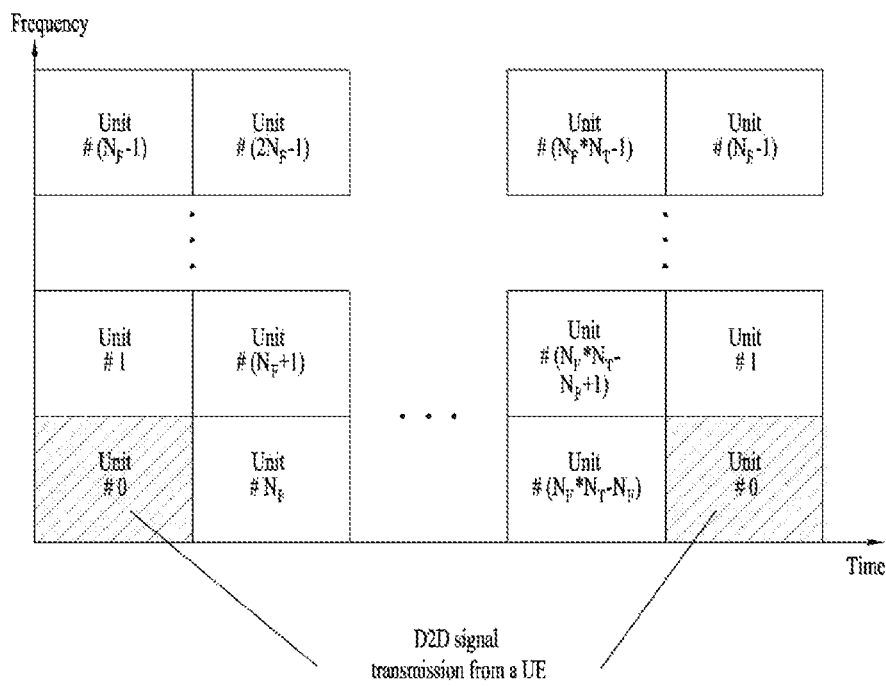

METHOD AND APPARATUS FOR V2X TERMINAL TRANSMITTING DATA IN WIRELESS COMMUNICATION SYSTEM

This application is a National Stage Application of International Application No. PCT/KR2016/015281, filed on Dec. 26, 2016, which claims the benefit of U.S. Provisional Application No. 62/387,477, filed on Dec. 24, 2015, U.S. Provisional Application No. 62/335,061, filed on May 11, 2016 and U.S. Provisional Application No. 62/339,937, filed on May 22, 2016, all of which are hereby incorporated by reference in their entirety for all purposes as if fully set forth herein.

TECHNICAL FIELD

Following description relates to a wireless communication system, and more particularly, to a method for a V2X (vehicle to everything) UE to transmit data and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

When a message is aperiodically transmitted like an event triggered message, if the message has a higher priority, it is necessary to protect the message from interference of a different UE. Hence, the present invention proposes a data transmission method of the message.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting control information and data, which are transmitted by a user equipment (UE) in a wireless communication system, includes the steps of transmitting first control information in a control information resource pool, and transmitting data through a resource indicated by the first control information in a data resource pool. In this case, a size of a transmission gap between the control information resource pool and the data resource pool can be configured according to a priority.

To further achieve these and other advantages and in accordance with the purpose of the present invention, according to a different embodiment, a user equipment transmitting control information and data in a wireless communication system includes a transmitter and a receiver, and a processor, the processor configured to transmit first control information in a control information resource pool, the processor configured to transmit data through a resource indicated by the first control information in a data resource pool. In this case, a size of a transmission gap between the control information resource pool and the data resource pool can be configured according to a priority.

The transmission gap may have a bigger value as a priority is getting higher.

If a priority is lower than a priority checked in second control information received by the UE, the UE can determine a resource for transmitting the data in a manner that a resource indicated by the second control information is not overlapped with a resource indicated by the first control information.

If a priority is lower than a priority checked in second control information received by the UE and a resource indicated by the second control information is overlapped with a resource reserved by the UE, the UE can perform resource reallocation on the reserved resource.

The priority can be configured according to a UE type.

The UE type includes a pedestrian UE (P-UE) type and a vehicle UE (V-UE) type and a P-UE type UE may have a priority higher than a priority of a V-UE type UE.

The priority can be configured according to a message type of the data.

The message type includes an event triggered message type and a periodic message type and an event triggered message may have a priority higher than a priority of a periodic message.

The event triggered message may correspond to a DENM (decentralized environmental notification message) and the periodic message may correspond to a Cam (cooperative awareness message).

The transmission gap can be configured in a unit of a control information transmission period.

The control information can include information indicating whether or not control information is further transmitted within the transmission gap.

The control information includes counter information and the counter information can indicate a count of a period at which a data resource pool in which the data is transmitted appears.

Advantageous Effects

According to the present invention, it is able to efficiently protect a resource region of a message without making a reservation for an additional resource.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIG. 8 is a diagram for an example of a D2D resource pool for performing D2D communication;

BEST MODE

Mode for Invention

Figure 1:
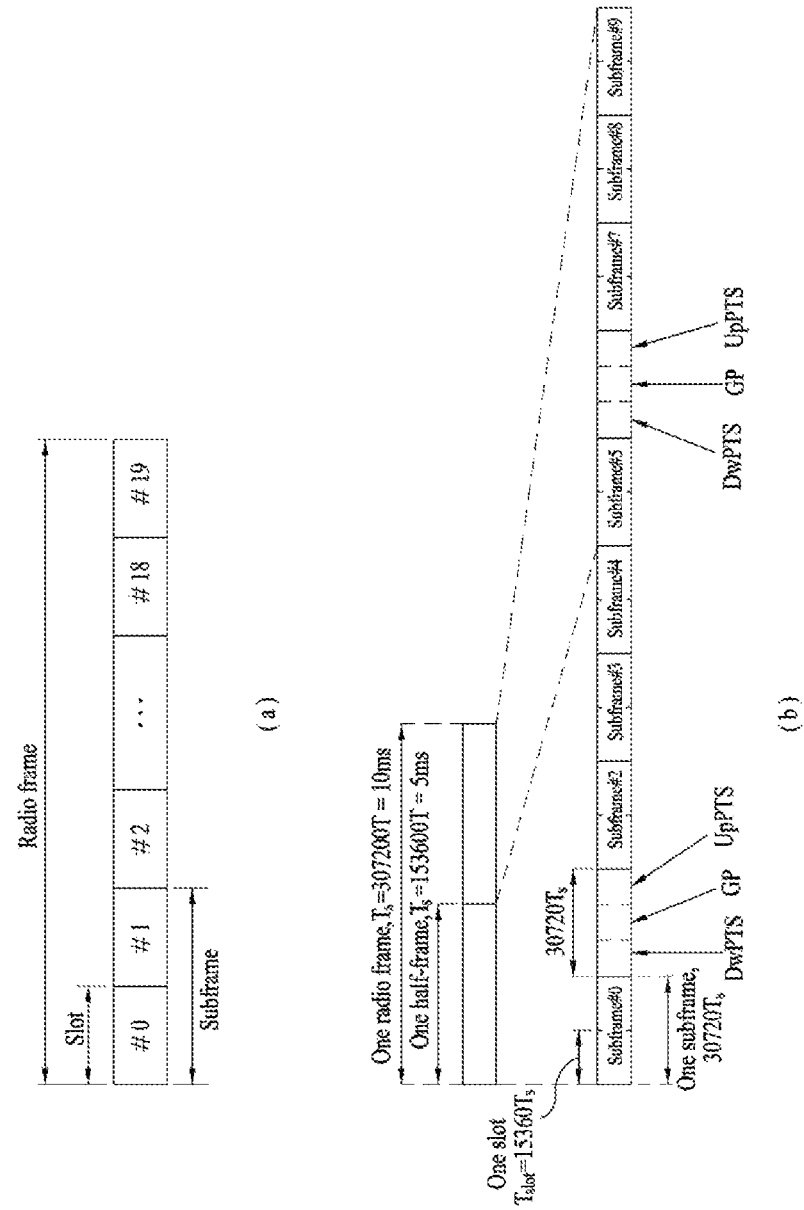
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
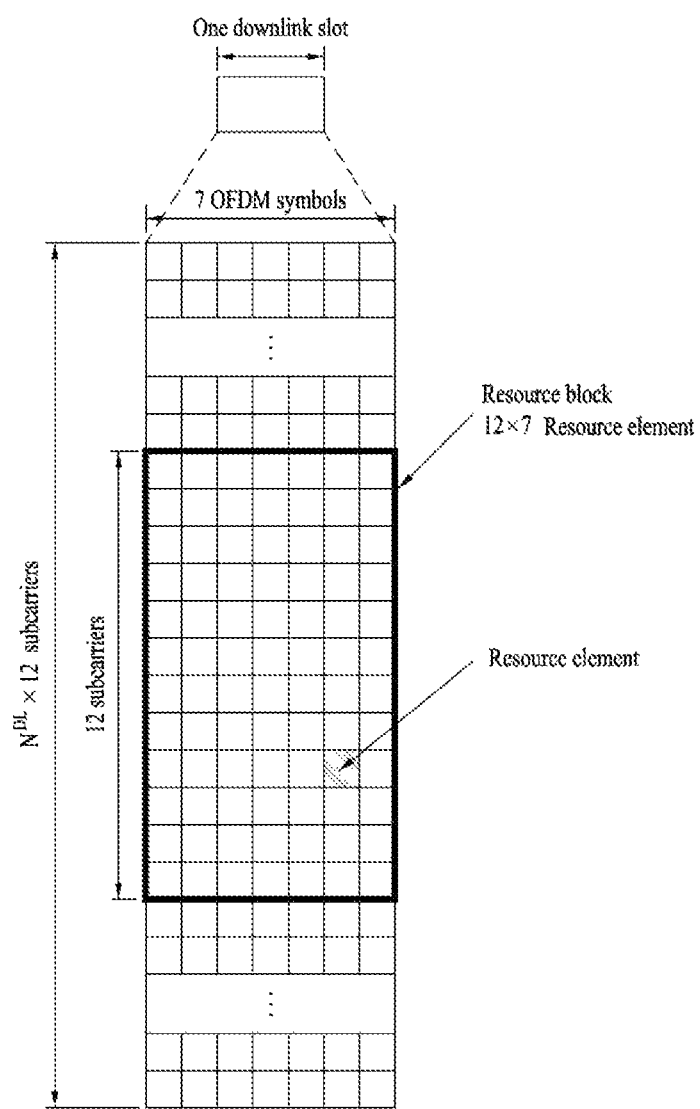
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
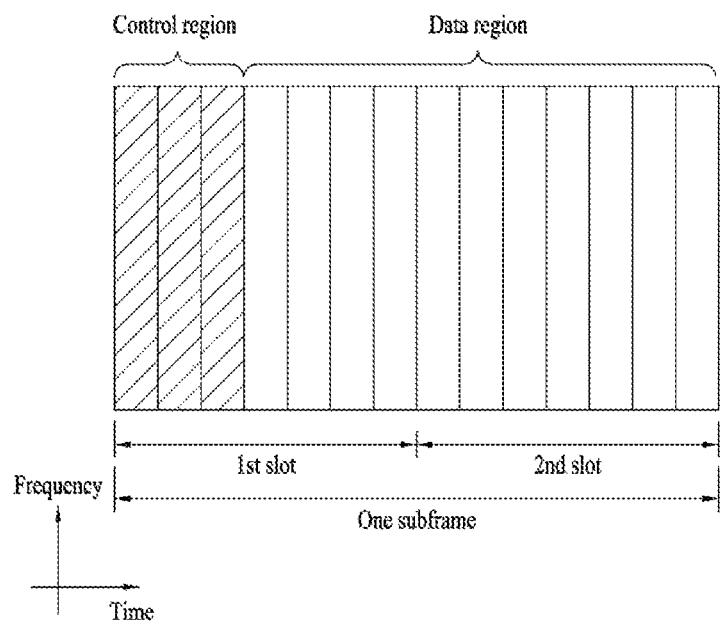
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
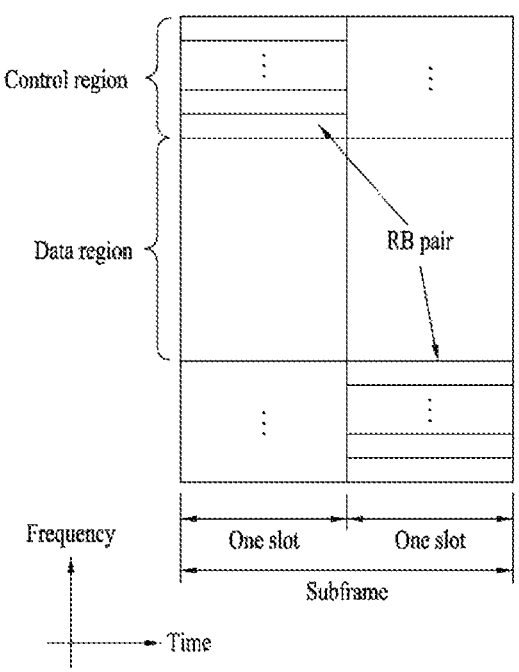
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \Lambda, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{s}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_1} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
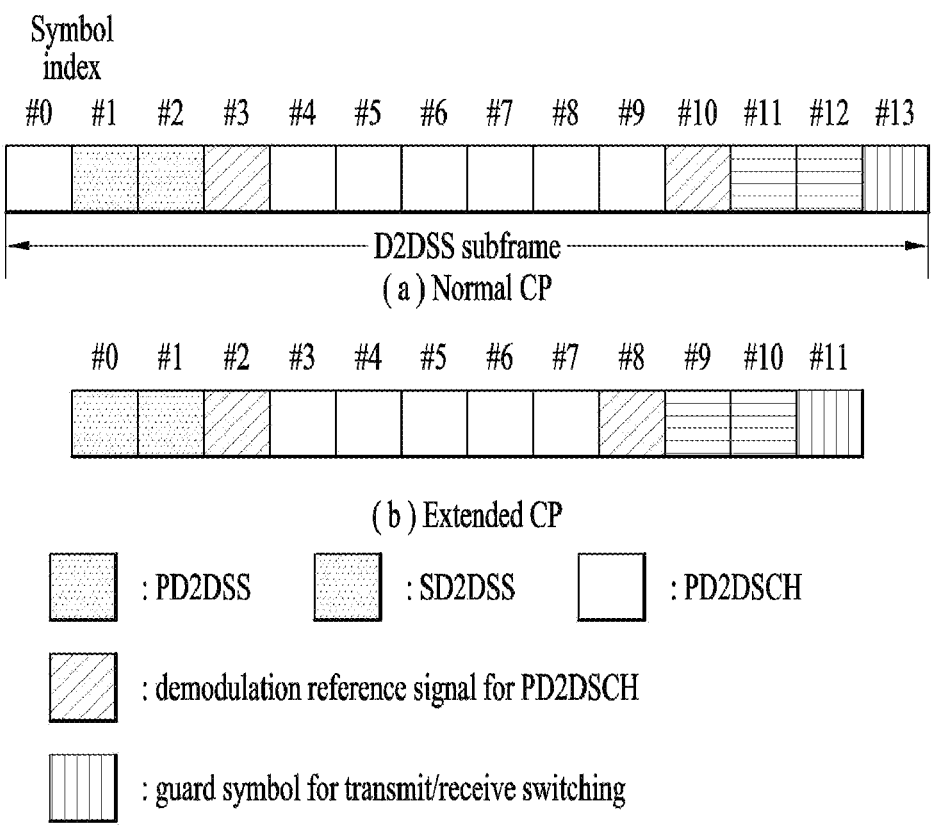
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
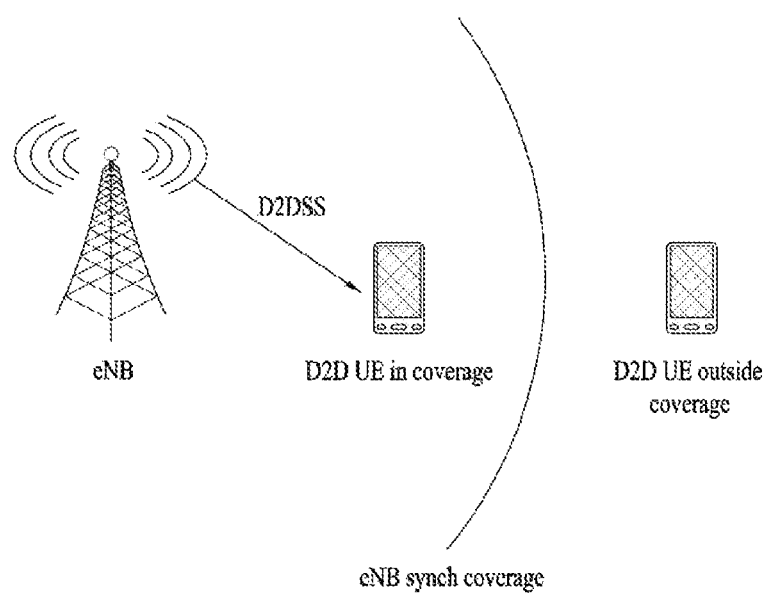
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
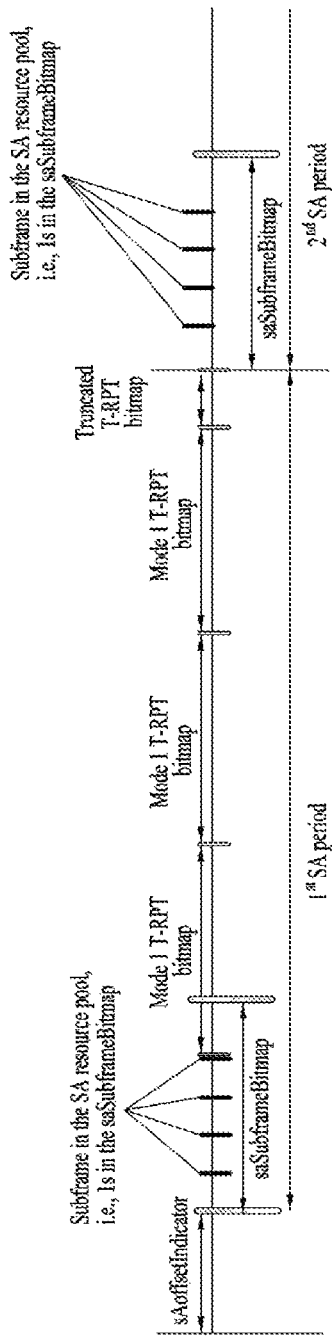
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

In the following, a method of transmitting a message of a higher priority to be protected in V2V (vehicle to vehicle) communication or D2D (device to device) communication is explained. In the following description, control information may correspond to control information in the aforementioned (D2D, V2X) SA or New RAT (radio access technology; in the present invention, New RAT commonly refers to a wireless access scheme except LTE).

As a method for protecting a message of a higher priority or a transmission of a UE, according to an embodiment of the present invention, a size of a transmission gap (i.e., a difference between a time resource in which a control signal is transmitted and a time resource in which a data signal is transmitted) can be differently configured according to a priority. A UE transmits first control information in a control information resource pool and can transmit data via a resource indicated by the first control information in a data resource pool. In this case, a size of a transmission gap between the control information resource pool and the data resource pool is configured according to a priority. This configuration can be signaled to the UE by a network or can be determined in advance. In this case, the transmission gap can be configured to have a bigger value as a priority is getting higher.

Figure 10:
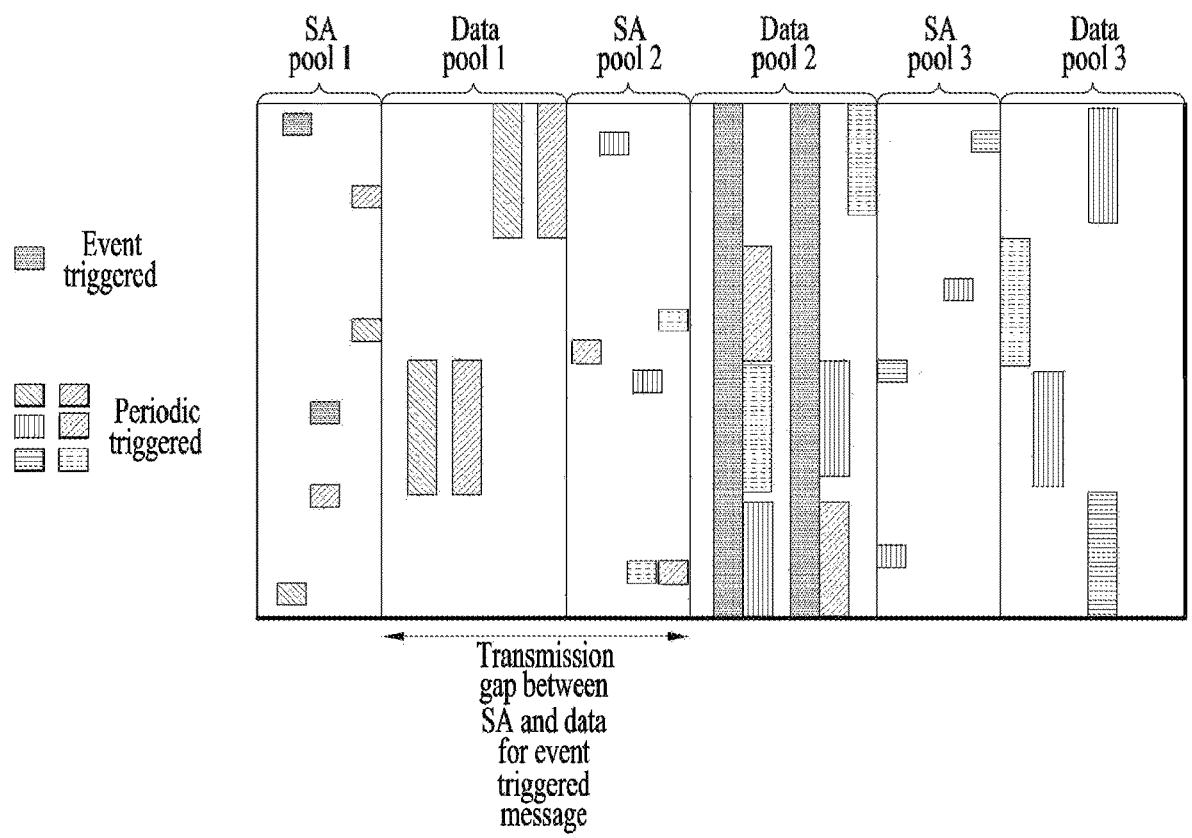
FIGS. 10 to 13 are diagrams illustrating transmission of control information having a transmission gap and data according to embodiments of the present invention.

In general, transmission of a UE or data of a higher priority is preferentially transmitted (to make a size of a gap to be smaller). Yet, the embodiment of the present invention configures a transmission gap to be bigger as a priority is getting higher in consideration of the specialty that control information and data are transmitted with a transmission gap, the specialty that intensive scheduling is not performed by a single scheduling node, and/or the specialty that each transmission entity avoids a collision only after control information of a different transmission entity is received. In relation to this, referring to FIG. 10, when a UE transmits a periodic message, the UE transmits data in a data pool firstly appearing after an SA pool. On the contrary, when a UE transmits an event triggered message, the UE transmits data in a data pool secondly appearing after an SA pool. When UEs transmit a periodic message in an SA pool 1, although the UEs receive SA for an event triggered message, since the UEs has already transmitted SA, the UEs are unable to change a data transmission resource position. In particular, if data of the event triggered message is transmitted in a next data pool, UEs transmitting in an SA pool 2 can select a resource by avoiding a data resource of the event triggered message in a data pool 2.

In relation to the aforementioned configuration, if a priority is lower than a priority checked by second control information received by a UE, a resource for transmitting data can be determined in a manner that a resource indicated by the second control information is not overlapped with a resource indicated by the first control information. In particular, since a message of a higher priority has a relatively sufficient transmission gap in transmission, a UE transmitting a message of a lower priority avoids the transmission gap to protect the transmission of the message of a higher priority. In relation to the operation of the UE that protects the transmission of the message of a higher priority, if a priority of a message is lower than a priority checked by the second control information received by the UE and a resource indicated by the second control information is overlapped with a resource reserved by the UE, the UE can perform resource reallocation on the reserved resource.

The aforementioned priority is explained in more detail. A size of a transmission gap can be differently configured according to a priority level. For example, a size of a transmission gap of a UE having a priority level 3 can be configured in a manner of being different from a size of a transmission gap of a message having a priority level 2. As a priority level is getting higher, a transmission gap can be configured to be bigger. This is aimed for UEs having a lower priority to avoid a message (of a UE) having a higher priority. (As a different method, as a priority level is getting higher, a transmission gap between SA and data can be configured to be smaller. This is aimed for more quickly transmitting data as a priority is getting higher.)

A priority can be configured according to a type of a UE. For example, a UE type can include a pedestrian UE (P-UE) type and a vehicle UE (V-UE) type. A P-UE type UE may have a priority higher than a priority of a V-UE type UE. This is because, if the P-UE wakes up and monitors a transmission resource for a long time, since a battery is considerably consumed, the P-UE transmits SA immediately after the P-UE wakes up. Since the V-UE is less sensitive to a battery consumption issue, the V-UE always monitors a transmission resource. If the V-UE receives SA of the P-UE, the V-UE provides a higher priority (bigger transmission gap) to the P-UE to perform an operation of avoiding a data resource position of the P-UE.

And, a priority can be configured according to a message type of a data. The message type can include an event triggered message type and a periodic message type. The event triggered message may have a priority higher than a priority of the periodic message. In this case, the event triggered message may correspond to a DENM (decentralized environmental notification message) and the periodic message may correspond to a CAM (cooperative awareness message). The CAM can be transmitted with a predetermined period and the DENM can be transmitted only when a specific event occurs. The CAM can include dynamic status information of a vehicle such as direction and velocity, static data of a vehicle such as a size, and basic vehicle information such as external light status, path history, and the like. A size of the CAM may correspond to 50 to 300 bytes. The DENM may correspond to a message which is generated when an accidental status such as malfunction of a vehicle, an accident, and the like occurs. A size of the DENM may be less than 3000 bytes. All vehicles located within a transmission range of the DENM can receive the DENM. In this case, the DENM may have a priority higher than a priority of the CAM. In this case, in the aspect of a single UE, the higher priority means that a UE preferentially transmits a message of a higher priority when messages are transmitted at the same time. Or, the higher priority means that a UE intends to preferentially transmit a message of a higher priority in time among a plurality of messages. In the aspect of a plurality of UEs, since a message of a higher priority receives less interference compared to a message of a lower priority, it may be able to lower a reception error rate.

A transmission gap can be signaled by a network or an RSU according to a priority or can be determined in advance. A transmission gap can be UE-commonly signaled to a UE or can be UE-specifically indicated to a UE via dedicated signaling.

Meanwhile, an upper limit and/or a lower limit of a gap used by a UE can be configured by a network (via MAC or RRC signaling). When a UE indicates a size of a gap via SA, if there is a limit on the indicated bit number, it is necessary to determine a method of representing the bit number. For example, assume that states capable of indicating a size of a gap via SA are restricted to N (N=2^B, B corresponds to a bit number capable of indicating a gap). In this case, if an upper limit and a lower limit of a gap are given by G_max, G_min, an actual position of a gap indicated by each state of SA can be determined by equation 1 described in the following.

$$G\_min+\text{floor}((G\_max-G\_min)/(N-1)*i),$$
$$i=0,\ldots,N-1$$

$$G\_min+\text{ceil}((G\_max-G\_min)/(N-1)*i),$$
$$i=0,\ldots,N-1 \qquad \text{[Equation 1]}$$

This is a method for sampling a position of a gap as uniform as possible for the limited number of bits.

Figure 11:
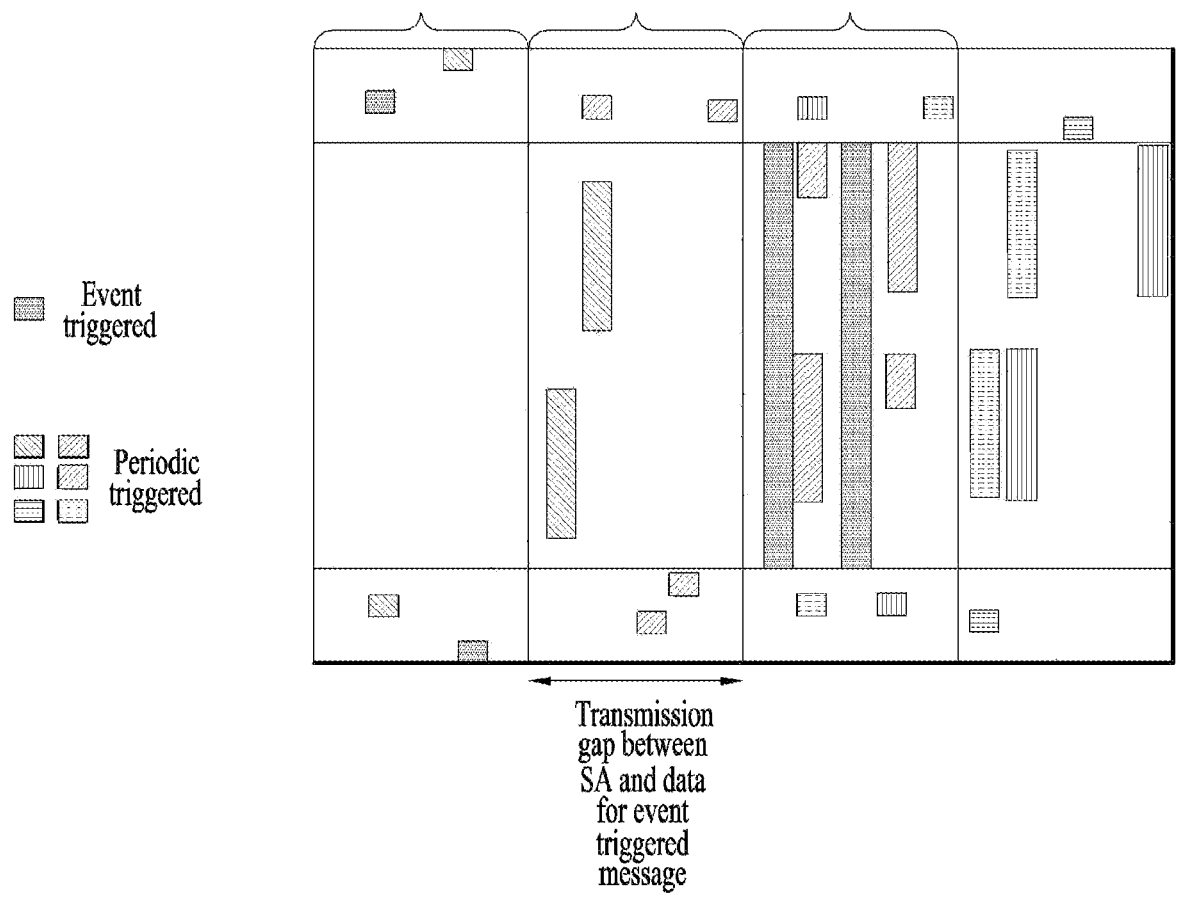

A transmission gap can be configured in a unit of a control information period (e.g., SA period). Or, the transmission gap can be configured in a unit of a subframe or a radio frame. In the example shown in FIG. 10, a transmission gap is configured in a unit of a control information transmission period. In particular, in case of an event triggered message, a transmission gap between SA transmission and data transmission associated with the SA transmission corresponds to a control information transmission period. Meanwhile, in LTE Rel-12/13, an SA pool and a data pool are configured in a form of TDM. On the other hand, as shown in FIG. 11, an SA pool and a data pool can also be configured in a form of FDM. In this case, as shown in FIG. 11, a transmission gap can be configured in a unit of a size of a single SA pool (or sub pool).

As mentioned in the foregoing description, in case of a message having a higher priority, data transmission can be performed after time as much as a transmission gap is elapsed after SA transmission is performed. In this case, a UE transmitting a message of a lower priority may not perform SA transmission and/or data transmission in a corresponding subframe not only to transmit SA and/or data but also to receive an event triggered message. In particular, if a UE detects SA of a higher priority in a previous control information transmission period, it may be able to determine a rule that the UE selects an SA transmission resource and a data transmission resource from among transmission resources except a data position (a time/frequency resource or a time resource (entire subframe) indicated by the SA of the higher priority.

Figure 12:
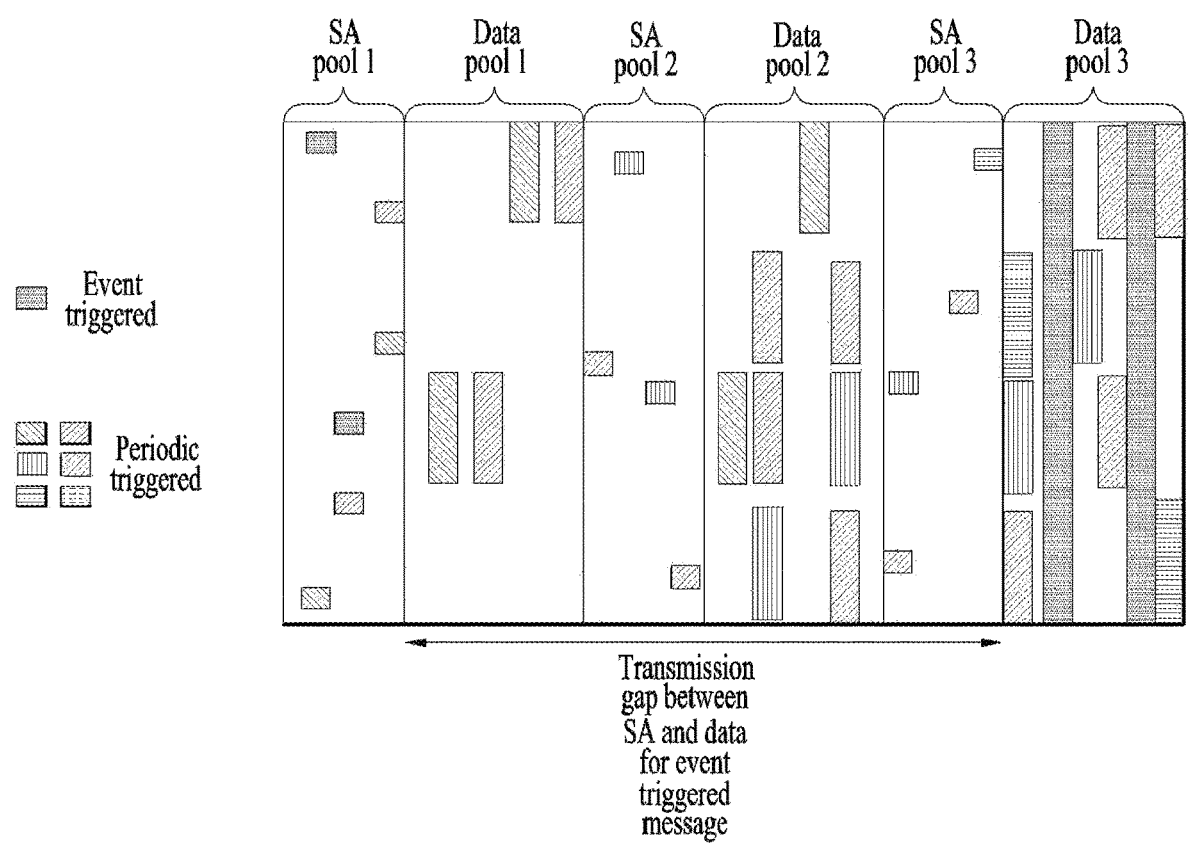

When SA is transmitted, if the SA is applied over a plurality of control information transmission periods, a transmission gap can be increased in accordance with the periods. FIG. 12 illustrates a situation that SA is transmitted, the SA is applied over two control information transmission periods, and a transmission gap of an event triggered message is increased in accordance with the periods. In particular, if the SA indicates data transmission during a plurality of data periods (or a plurality of subframes or radio frames), a transmission gap can be increased in proportion to the periods. In this case, a length of a section to which data transmission is applied after SA transmission can be differently configured according to a priority. For example, in case of a message having a higher priority, it may be able to apply data transmission for more periods (e.g., a control information period or a repetition number). In case of a message having a lower priority, it may be able to perform data transmission for a relatively short period (e.g., a control information period or a repetition number). In particular, in case of a message of a higher priority, data transmission is maintained for more time to make more UEs receive the message. In other word, when SA is transmitted, a length of a period (a repetition number in a control information transmission period or a length of a control information transmission period to which data allocation of SA is applied) to which a resource position indicated by the SA is applied can be differently configured according to a priority level or a UE type (P-UE or V-UE).

Control information can include information indicating whether or not control information is further transmitted within a transmission gap. For example, as shown in FIG. 12, when a transmission gap is applied to a message of a specific priority, whether or not additional SA transmission is to be performed between initial SA transmission and data transmission associated with the SA (within a transmission gap (period)) can be determined by a network, can be determined in advance, or can be determined by an autonomous determination of a UE. If the additional SA transmission is performed, a field for indicating a data pool appearing after an SA pool can be transmitted in a manner of being included in the SA. Or, as a method of differently configuring a part of a physical format (DMRS position, DMRS sequence, CS, OCC, etc.) of the SA, it may be able to indicate a data pool (SA period), a subframe, or a radio frame in which data is to be transmitted.

Figure 13:
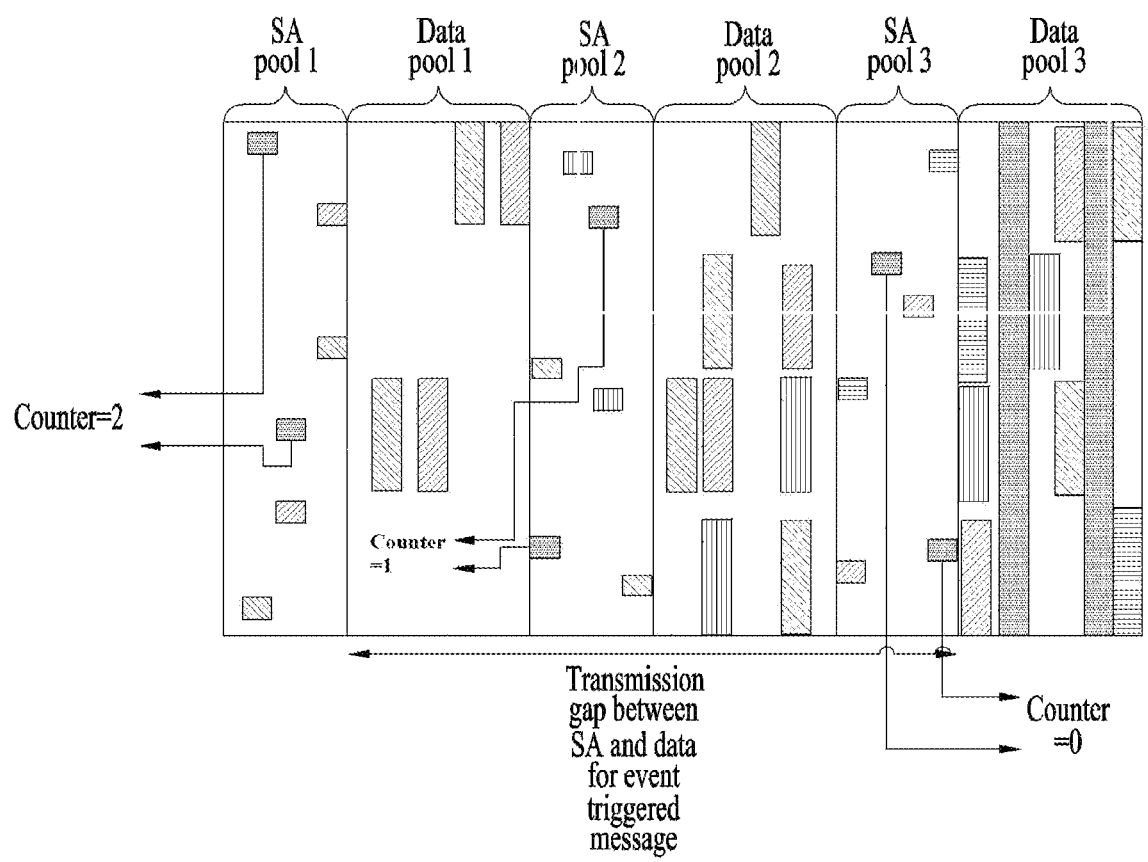

Control information includes counter information. The counter information can indicate a count of a period (or a subframe or a radio frame) at which a data resource pool in which data is transmitted appears. A counter for indicating an SA period in which data transmission is to be performed can be transmitted in a manner of being included in SA (in a unit of a period, a subframe, or a radio frame). FIG. 13 illustrates a corresponding embodiment. An event triggered message is configured by counter=2 in an SA pool 1 to indicate that data is to be transmitted in a data pool 3. The counter is decreased by 1 in an SA pool 2 to indicate that data is to be transmitted in a next SA period. The counter is decreased again in an SA pool 3 to indicate that data is to be transmitted in an immediately adjacent data pool. As a different method, it may be able to simply include 1-bit indicator to indicate whether or not a data is transmitted in a very next data pool (an SA period, a subframe, or a radio frame). Or, a field for explicitly indicating a data pool (an SA period, a subframe, or a radio frame) can be transmitted in a manner of being included in the SA. In particular, when UEs are unable to receive SA of a message of a higher priority due to a half-duplex constraint, if SA transmission is additionally performed within a transmission gap period, it may be able to prevent the UE from continuously failing to receive the SA. And, it may be able to make Tx/Rx UE know a data pool to which the SA is applied.

Meanwhile, a size of a gap according to a priority can also be determined according to a size of a message and/or a power control configuration method of SA and data. For example, if a message size exceeds a prescribed size, SA and data are transmitted in a manner of being FDMed. As a result, coverage of the SA can be considerably reduced. In this case, it may be able to configure a gap to make the data and the SA to be TDMed. In particular, it is able to perform TDM transmission (between a control signal and a data signal) having a transmission gap for power control. For example, a UE preferentially assigns a part of transmit power to the SA and assigns the remaining transmit power to the data. In this case, if an RB size (or a message size) of the data is big, a PSD difference between the SA and the data may exceed a prescribed threshold or power to be allocated to the data is not sufficient enough. In this case, it may be able to perform the TDM transmission by configuring a gap between the SA and the data. In other word, if it fails to sufficiently satisfy a power condition (e.g., PSD difference between the SA and the data) configured for performing FDM between the SA and the data, it may be able to perform TDM transmission by configuring a gap between the SA and the data.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

Configurations of Devices for Embodiments of the Present Invention

Figure 14:
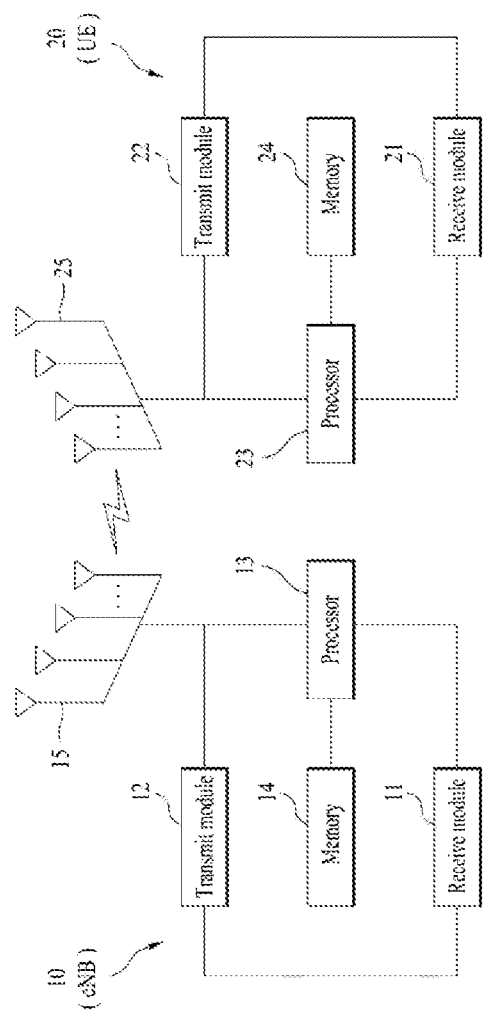
FIG. 14 is a diagram illustrating configurations of a transmission/reception device.

FIG. 14 is a diagram illustrating configuration of a transmit point apparatus and a UE according to one embodiment of the present invention.

Referring to FIG. 14, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 14, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 14 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting control information and data, which are transmitted by a user equipment (UE) in a wireless communication system, comprising the steps of:

receiving configuration information for a control information resource pool and a plurality of data resource pools;
selecting first transmission resources for first control information from the control information resource pool;
selecting second transmission resources for transmission of a data signal from a data resource pool;
transmitting the first control information, including information on the second transmission resources in the first transmission resources; and
transmitting the data signal in second transmission resources,
wherein the first control information further includes information related to a modulation and coding scheme (MCS) for decoding the data signal, and a priority,
wherein the data resource pool is determined among the plurality of data resource pools, based on a transmission gap between the control information resource pool and the data resource pool and based on the priority,
wherein the transmission gap has a larger value as the priority is higher,
wherein the first transmission resources are selected in the control information resource pool regardless of the priority, and
wherein the priority is configured based on a message type of a message included in the data signal.

2. The method of claim 1, wherein, based on a reception of second control information including a priority higher than the priority, the UE determines the second transmission resource for transmitting the data in a manner such that a resource indicated by the second control information is not overlapped with the second transmission resources.

3. The method of claim 1, wherein, based on a reception of second control information indicating a resource overlapping the second transmission resources and including a priority higher than the priority, the UE performs resource reallocation on the second transmission resources.

4. The method of claim 1, wherein the message type comprises an event triggered message type and a periodic message type and wherein an event triggered message has a priority higher than a priority of a periodic message.

5. The method of claim 4, wherein the event triggered message corresponds to a DENM (decentralized environmental notification message) and wherein the periodic message corresponds to a Cam (cooperative awareness message).

6. The method of claim 1, wherein the control information contains information indicating whether or not control information is further transmitted within the transmission gap.

7. The method of claim 1, wherein the control information contains counter information and wherein the counter information indicates a count of a period at which a data resource pool in which the data is transmitted available.

8. A user equipment configured for transmitting control information and data in a wireless communication system, comprising:
a transmitter and a receiver; and
a processor,
wherein the processor is configured to receive configuration information for a control information resource pool and a plurality of data resource pools, select first transmission resources for first control information from a control information resource pool, select second transmission resources for transmission of a data signal from a data resource pool, transmit the first control information, including information on the second transmission resources in the first transmission resources, and transmit the data signal in the second transmission resources,
wherein the first control information further includes information related to a modulation and coding scheme (MCS) for decoding the data signal, and a priority,
wherein the data resource pool is determined among the plurality of data resource pools, based on a transmission gap between the control information resource pool and the data resource pool and based on the priority,
wherein the transmission gap has a larger value as the priority is higher,
wherein the first transmission resources are selected in the control information resource pool regardless of the priority, and
wherein the priority is configured based on a message type of a message included in the data signal.

* * * * *